(12) United States Patent
Jian et al.

(10) Patent No.: US 12,495,004 B2
(45) Date of Patent: Dec. 9, 2025

(54) PFD MANAGEMENT METHOD, NETWORK ELEMENT AND COMPUTER-READABLE STORAGE MEDIUM

(71) Applicant: ZTE CORPORATION, Shenzhen (CN)

(72) Inventors: Huijun Jian, Shenzhen (CN); Lichang Hou, Shenzhen (CN); Yang Shen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 403 days.

(21) Appl. No.: 18/247,164

(22) PCT Filed: Aug. 6, 2021

(86) PCT No.: PCT/CN2021/111291
§ 371 (c)(1),
(2) Date: Mar. 29, 2023

(87) PCT Pub. No.: WO2022/068398
PCT Pub. Date: Apr. 7, 2022

(65) Prior Publication Data
US 2023/0379261 A1    Nov. 23, 2023

(30) Foreign Application Priority Data

Sep. 30, 2020    (CN) .......................... 202011056552.6

(51) Int. Cl.
*H04L 47/2441*    (2022.01)
*H04L 12/14*    (2024.01)
(Continued)

(52) U.S. Cl.
CPC .......... *H04L 47/2441* (2013.01); *H04L 12/14* (2013.01); *H04L 12/1407* (2013.01);
(Continued)

(58) Field of Classification Search
CPC . H04L 47/2441; H04L 12/14; H04L 12/1407; H04L 47/24; H04L 47/2475;
(Continued)

(56) References Cited

U.S. PATENT DOCUMENTS 11,233,666 B2    1/2022 Ding
2018/0069798 A1*    3/2018 Bacik ...................... H04L 47/20
(Continued)

FOREIGN PATENT DOCUMENTS

| CN | 110580256 A | 12/2019 |
| CN | 110768810 A | 2/2020 |
| KR | 20190134741 A | 12/2019 |

OTHER PUBLICATIONS

"ETSI", TS 123 503 V16.5.0 (Jul. 2020), 5G; Policy and charging control framework for the 5G System (5GS); Stage 2 (3GPP TS 23.503 version 16.5.0 Release 16) (Year: 2027).*

(Continued)

*Primary Examiner* — Brian J. Gillis
*Assistant Examiner* — Chhian (Amy) Ling
(74) *Attorney, Agent, or Firm* — Vivacqua Crane, PLLC

(57) ABSTRACT

A PFD management method, a network element and a computer-readable storage medium are disclosed. The method may include: acquiring and storing PFD management request information sent by an Application Function (AF), wherein the PFD management request information comprises access point name (APN) information, application identifiers (APP ID), and a PFD, and the APN information and APP ID are associated with the PFD; and forwarding the APN information, the APP ID, and the PFD in the PFD management request information to a (user plane function) UPF through a Session Management Function (SMF), to cause the UPF to store the PFD according to the APN information and the APP ID.

15 Claims, 6 Drawing Sheets

(51) Int. Cl.
  *H04L 47/24*    (2022.01)
  *H04L 47/2475*  (2022.01)
  *H04L 65/1066*  (2022.01)
  *H04M 15/00*    (2024.01)
  *H04W 4/24*     (2024.01)
  *H04L 67/14*    (2022.01)

(52) U.S. Cl.
  CPC .......... *H04L 47/24* (2013.01); *H04L 47/2475* (2013.01); *H04L 65/1066* (2013.01); *H04M 15/66* (2013.01); *H04W 4/24* (2013.01); *H04L 67/14* (2013.01); *H04M 15/57* (2013.01); *H04M 15/63* (2013.01); *H04M 15/8016* (2013.01); *H04M 15/8083* (2013.01)

(58) Field of Classification Search
  CPC .... H04L 65/1066; H04L 67/14; H04M 15/66; H04M 15/57; H04M 15/63; H04M 15/8016; H04M 15/8083; H04W 4/24
  See application file for complete search history.

(56) References Cited

U.S. PATENT DOCUMENTS

| | | | |
|---|---|---|---|
| 2018/0077247 A1* | 3/2018 | Wang | H04W 28/0268 |
| 2018/0192390 A1 | 7/2018 | Li et al. | |
| 2019/0246247 A1 | 8/2019 | Shen | |
| 2020/0154459 A1* | 5/2020 | Mukherjee | H04W 72/535 |
| 2021/0075868 A1 | 3/2021 | Hu et al. | |
| 2022/0224650 A1* | 7/2022 | Xu | H04L 47/2483 |

OTHER PUBLICATIONS

Wang et al., CN 110768810 A, "Method, device and system for determining message flow description", Feb. 7, 2020, English translation by Espacent, 102 Pages. (Year: 2020).*

ETSI TS 123 501 V15.7.0 (Oct. 2019)-5G; System architecture for the 5G System (5GS) (3GPP TS 23.501 version 15.7.0 Release 15), 250 Pages (Year: 2019).*

3GPP Technical Specification Group Core Network and Terminals. "Interface between the Control Plane and the User Plane Nodes; Stage 3," 3GPP TS 29.244, Jun. 2020.

International Searching Authority. International Search Report and Written Opinion for PCT Application No. PCT/CN2021/111291 and English translation, mailed Nov. 5, 2021, pp. 1-10.

European Patent Office. Extended European Search Report for EP Application No. 218740606.3, mailed Sep. 12, 2023, pp. 1-9.

European Telecommunications Standards Institute. "5G; 5G System; Policy and Charging Control signalling flows and QoS parameter mapping; Stage 3," 3GPP TS 29.513, v. 15.5.0, Release 15, 2019, pp. 1-93.

Korean Intellectual Property Office. First Office Action for KR Application No. 10-2023-7013190 and English translation, mailed Jun. 16, 2025, pp. 1-14.

* cited by examiner

PFD MANAGEMENT METHOD, NETWORK ELEMENT AND COMPUTER-READABLE STORAGE MEDIUM

CROSS-REFERENCE TO RELATED APPLICATION

This application is a national stage filing under 35 U.S.C. § 371 of international application number PCT/CN2021/111291, filed Aug. 6, 2021, which claims priority to Chinese patent application No. 202011056552.6 filed Sep. 30, 2020. The contents of these applications are incorporated herein by reference in their entirety.

TECHNICAL FIELD

The present disclosure relates to but is not limited to the technical field of 5G communication, in particular to a method for managing Packet Flow Description (PFD), a network element, and a computer-readable storage medium.

BACKGROUND

In the 5th Generation (5G) communication system, the Network Exposure Function (NEF) is deployed with the Packet Flow Descriptions Function (PFDF). PFDF can obtain the Packet Flow Description (PFD) provided by Application Service Provider (ASP) or Application Function (AF). Session Management Function (SMF) obtains PFD and application identifier (Application ID, APP ID) from PFDF, and sends PFD and APP ID to the corresponding User Plane Function (UPF). UPF performs application detection according to PFD, and realizes charging function at the service data stream level according to instructions in Policy and Charging Control (PCC) rules. However, with the increasing customization of services, the amount of service data, application detection, or charging control information corresponding to the same APP ID maybe even different, for different Access Point Name (APN), resulting in multiple rules overlapping with each other and lowering down the accuracy of charging.

SUMMARY

The following is a summary of the subject matter described herein. This summary is not intended to limit the scope of protection of the claims.

Provided are a method for managing Packet Flow Description (PFD), a network element, and a computer-readable storage medium in some embodiments of the present disclosure.

According to an aspect of the present disclosure, an embodiment provides a PFD management method, a method for managing Packet Flow Description (PFD), which is applied to a Network Exposure Element (NEF), the method may include, acquiring and storing PFD management request information sent by an Application Function (AF), where the PFD management request information includes access point name (APN) information, application Identifier (APP ID) and a PFD, and the APN information and APP ID are associated with the PFD; and forwarding the APN information, the APP ID and the PFD in the PFD management request information to a (user plane function) UPF through a Session Management Function (SMF), to cause the UPF to store the PFD according to the APN information and the APP ID.

According to another aspect of the present disclosure, an embodiment provides a method for managing Packet Flow Description (PFD), which is applied to a Session Management Function (SMF), the method may include, acquiring access point name (APN) information, an Application identifier (APP ID) and a PFD sent by a Network Exposure Function (NEF), where the APN information, APP ID and the PFD are parameters associated with each other in PFD management request information, and the PFD management request information is acquired from an Application Function (AF) and stored by the NEF; and sending the APN information, the APP ID and the PFD to a User Plane Function (UPF), to cause the UPF to store the PFD according to the APN information and the APP ID.

According to yet another aspect of the present disclosure, an embodiment provides a network element, which may include a memory, a processor, and a computer program stored in the memory and executable by the processor which, when executed by the processor causes the processor to carry out any one of the methods as described above.

According to yet another aspect of the present disclosure, an embodiment provides a computer-readable storage medium storing a computer-executable instruction which, when executed by a processor causes the processor to carry out any one of the methods as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

DETAILED DESCRIPTION

The purpose, technical scheme and advantages of the present disclosure will become apparent through the following description for various embodiments in conjunction with the drawings. It should be understood that the embodiments described here are intended for illustration but not limitation of the present disclosure.

It should be noted that although the network elements are shown with individual functional modules in the schematic diagram and the logical sequences are shown in the flow chart, in some cases, the devices can have different modules than those shown and the steps can be executed in a different order than those shown. The terms "first" and "second", if used in the description, claims and the drawings are intended to distinguish similar objects, and does not necessarily imply any specific order or sequence.

The present disclosure provides a method for managing Packet Flow Description (PFD), a network element, and a computer-readable storage medium. The method includes, acquiring and storing PFD management request information sent by an Application Function (AF), where the PFD management request information comprises access point name (APN) information, an Application Identifier (APP ID), and a PFD, and the APN information and APP ID are associated with the PFD; and forwarding the APN information, the APP ID and the PFD in the PFD management request information to a (user plane function) UPF through a Session Management Function (SMF), to cause the UPF to store the PFD according to the APN information and the APP ID. According to the technical scheme provide in various embodiments of the present disclosure, APN information can be appended on the basis of PFD and APP ID, so that UPF can identify PFD according to APN, thus avoiding overlapping between the service data streams, application probes or charging control information, and improving charging accuracy.

Some embodiments of the present disclosure will be further illustrated with reference to the drawings.

Figure 1:
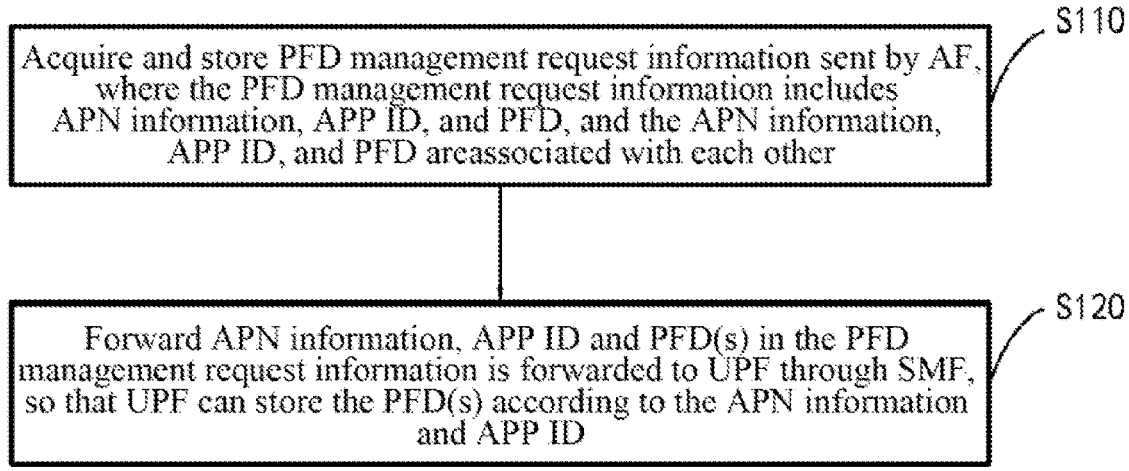
FIG. 1 depicts a flowchart showing a method for managing PFD applied to the NEF according to an embodiment of the present disclosure.

As shown in FIG. 1, which depicts a flowchart showing a PFD management method according to an embodiment of the present disclosure. The method includes but is not limited to S110 and S120.

At S110, PFD management request information sent by an AF is acquired, where the PFD management request information includes APN information, APP ID, and PFD, and the APN information, APP ID, and PFD are associated with each other.

In an embodiment, the PFD management request information includes any information related to PFD creation, such as APN information, Requester Identifier (RI), Service Node Reference Identifier (SP Reference ID), External Application Identifier (EAI), several sets of PFDs, operation information and delay information corresponding to PFD. And parameter types can be adjusted according to actual needs. This embodiment is not limited thereto. It should be noted that this embodiment does not specifically limit how the APN information is appended to the PFD management request information of AF. In some implementations, the APN information of the data stream can be acquired by AF when receiving data streams, so that the PFD management request information includes the APN information, and which will not be further discussed here.

Also, this embodiment does not limit the number of PFDs. In some implementations, the PFD management request information may include one set of PFDs or several sets of PFDs, as long as the PFDs can be identified according to APN information and the APP IDs. For the convenience of description, subsequent embodiments will be illustrated with one set of PFDs. Several sets of PFDs can implement the technical scheme of the present disclosure as an entirety, and which will not be further discussed here.

In an embodiment, APN information can be appended to all network element interfaces involved in data interaction, so that data streams among network elements can be identified by the APN information. Thereby, overlapping between the service data streams, application probes or charging control information with the same APP ID but different APN information is avoided.

In an embodiment, after receiving the PFD management request information sent by the AF, the authorization status of the AF can be determined according to a preset policy. For example, if it is determined that the AF has been authorized according to the policy specified by the operator, the NEF receives the PFD management request information sent by the AF and further processes the PFD management request information. The preset policy can be particularly specified according to the practical demand, and which is not limited in this embodiment.

At S120, the APN information, APP ID and PFD(s) in the PFD management request information is forwarded to UPF through SMF, so that UPF can store the PFD(s) according to the APN information and APP ID.

In an embodiment, the sending of APN information, APP ID and PFD in the PFD management request information can be triggered in any way. For example, the sending can be performed through the common PUSH mode for SMF, that is, NEF is sent to SMF in the form of a notification message. Alternatively, the sending can be performed through the common PULL mode for SMF, that is, an acquisition request is sent from SMF to NEF, so that NEF can send data in response to the acquisition request. The particular way for the sending can be selected according to actual demands. It should be noted that the APN information, APP ID and PFD of NEF shall be sent to the Unified Data Repository (UDR) for subsequent operation, and the parameters have not been established before the operation is completed. Therefore, the APN information, APP ID, and PFD in PFD management request information shall be forwarded to UPF through SMF after the operation to APN information, APP ID, and PFD has been completed in UDR.

In an embodiment, the storage of PFD management request information in NEF will cause some consumption of the resources in NEF. In view of this, a time for cache of each PFD management request information can be set.

Within the time for cache, PFD management request information is stored in the NEF. Once the time for cache expires, NEF discards the corresponding PFD management request information, thus saving resources.

In an embodiment, SMF can directly forward the received the APN information, APP ID and PFD to UPF. Alternatively, the SMF may first store the APN information, APP ID and PFD locally and then forward them to the UPF after receiving the UPF acquisition request. The sending can be adjusted according to actual demands, and which is not limited in this embodiment. It should be noted that UPF can store APN information, APP ID and PFD locally after receiving them. Therefore, UPF can store several APN information and corresponding PFDs locally. When UPF performs application detection, matching is performed according to the APN information in the detection request, so as to identify the PFDs according to APN information and avoid overlapping caused by data with different rules.

Figure 3:
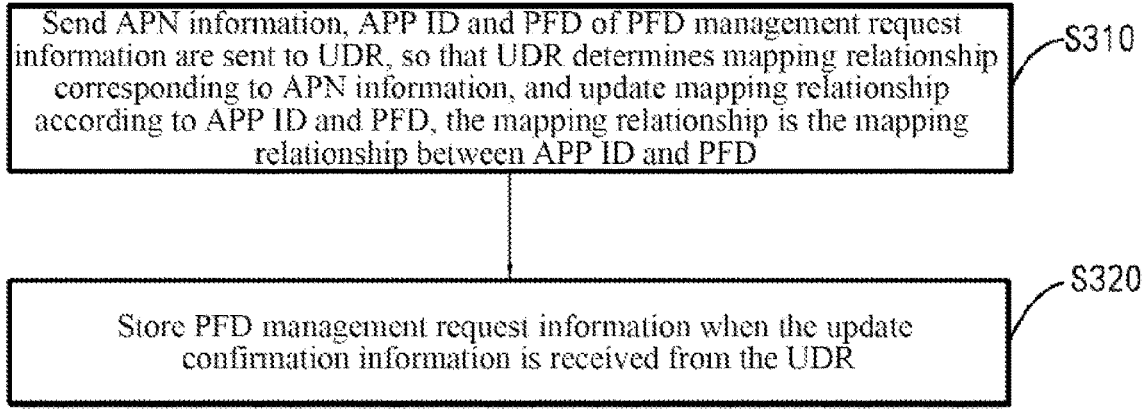
FIG. 3 depicts a flowchart showing the storing of the PFD management request information in a method for managing PFD applied to the NEF according to another embodiment of the present disclosure.

Referring to FIG. 3, in an embodiment, S110 in the embodiment shown in conjunction with FIG. 1 further includes, but is not limited to, the following operations.

At S310, the APN information, APP ID and PFD of PFD management request information are sent to the UDR, so that UDR can determine the mapping relationship corresponding to APN information, and update the mapping relationship according to APP ID and PFD, the mapping relationship is the mapping relationship between APP ID and PFD.

At S320, the PFD management request information is stored when the update confirmation information is received from the UDR.

Figure 2:
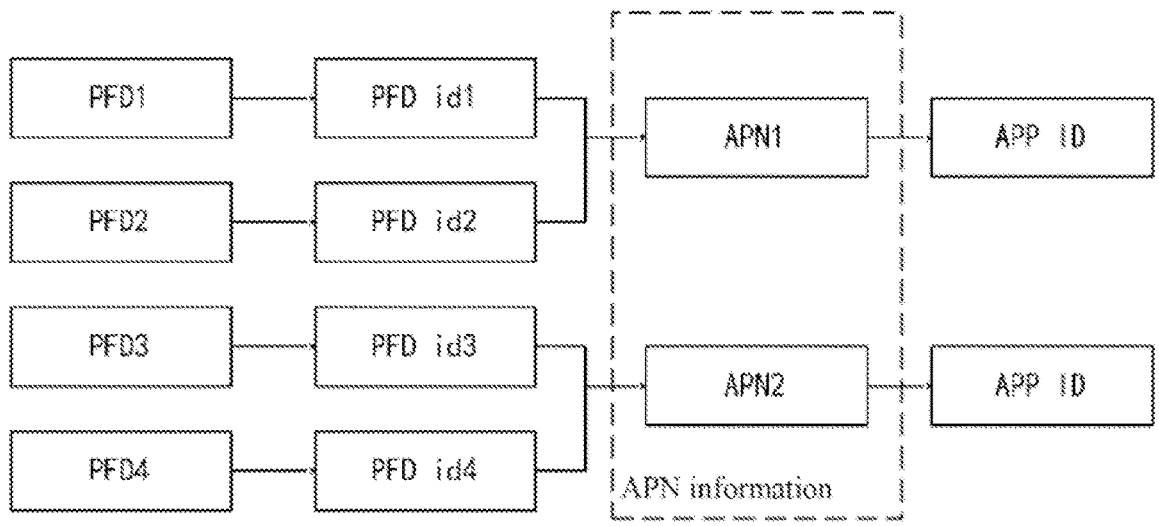
FIG. 2 depicts a schematic diagram showing the context organization relationship between APN and PFD in UDR according to another embodiment of the present disclosure.

Referring to FIG. 2, which depicts a schematic diagram of the context organization relationship between APN and PFD in UDR. It should be noted that this context organization relationship in UDR is shown by way of an example merely, and other interfaces involved in the present disclosure can also meet the context organization relationship shown in FIG. 2 or similar ones, and which will not be further discussed here. As shown in FIG. 2, one single APP ID can correspond to several APN information respectively, where each APN information can correspond to any number of PFDs which can be identified by PFD IDs. FIG. 2 shows that one single APP ID corresponds to APN1 and APN2, APN1 corresponds to PFD1 and PFD2, and APN2 corresponds to PFD3 and PFD4.

In an embodiment, because UDR can be used for storage, all data in PFD management request information can be saved and identified by the mapping relationship. The mapping relationship can take any form, as long as unique correspondence is achieved. For example, a PFD list can be set in UDR. And each PFD in the PFD list has respective APN information and a respective APP ID. It shall be appreciated that, since the cache in NEF is time-sensitive, the mapping relationship and PFD storage in UDR enables the acquisition of the backup APN information, APP ID and PFD from UDR when the cache fails and SMF request for data acquisition is received, so as to ensure the integrity of data.

In an embodiment, NEF can transfer data by calling the update function of UDR, e.g., by setting the parameters required for the update function of UDR as APN information, APP ID, PFD, PFD operation information and delay information, etc. When NEF calls the update function, NEF acquires the corresponding parameters from the PFD management request information and transmits them to UDR. It is clear that, other data methods for data transmission and reception can be utilized, and this embodiment is not limited thereto.

In an embodiment, the UDR, after completing the update of the mapping relationship, sends update confirmation information to NEF, so that NEF can confirm that, the data in PFD management request information has been backed up, and is ready for subsequent operations, such as accepting SMF's acquisition request or starting to maintain the timeliness of cache.

Figure 4:
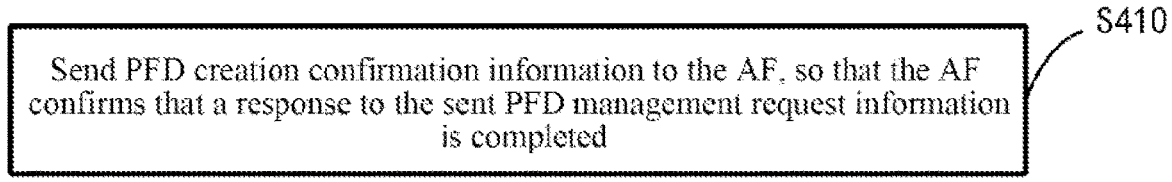
FIG. 4 depicts a flowchart showing the sending of the PFD creation confirmation information to AF in the method for managing PFD applied to NEF according to another embodiment of the present disclosure.

Referring to FIG. 4, in an embodiment, S320 in the embodiment shown in conjunction with FIG. 3 further includes, but is not limited to, the following operations.

At S410, PFD creation confirmation information is sent to the AF, so that the AF can confirm that a response to the sent PFD management request information is completed.

In an embodiment, the PFD management request information is sent by AF and the creation is triggered once the request information is received. And thus, the AF can be in a state of waiting for a response after sending the PFD management request information to confirm that the PFD management request information has been processed in both NEF and UDR. Based on this, NEF can send the PFD creation confirmation information to AF after receiving the update confirmation information sent by UDR, thus completing the closed loop of the creation.

Figure 5:
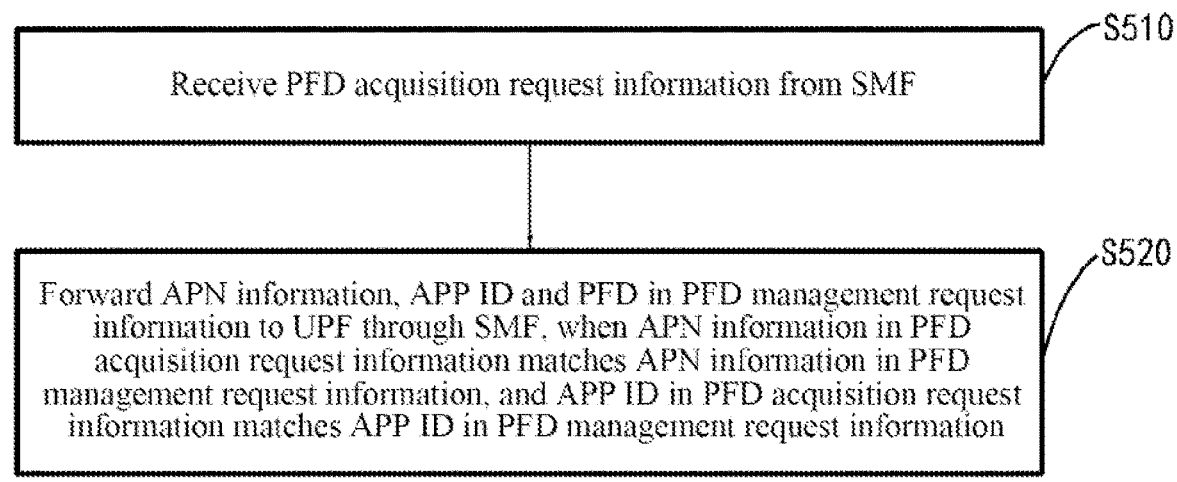
FIG. 5 depicts a flowchart showing the response to the PFD acquisition request information sent by SMF in the method for managing PFD applied to the NEF according to another embodiment of the present disclosure.

Referring to FIG. 5, in an embodiment, S120 in the embodiment shown in conjunction with FIG. 1 further includes, but is not limited to, the following operations.

At S510, PFD acquisition request information is received from SMF.

At S520, APN information, APP ID and PFD in PFD management request information are forwarded to UPF through SMF, when APN information in PFD acquisition request information matches APN information in PFD management request information, and APP ID in PFD acquisition request information matches APP ID in PFD management request information.

In an embodiment where SMF acquires data through PULL mode, SMF generates PFD acquisition request information according to APN information and APP ID to be acquired, and sends the PFD acquisition request information to NEF. It should be noted that since the data is cached in NEF, the acquisition of the PFD from NEF according to APN information and APP ID may fail. In view of this, when NEF receives the PFD acquisition request information, matching is performed in which the APN information and APP ID in PFD acquisition request information are matched with those in the PFD management request information respectively. If the matching is successful, it is indicated that the corresponding PFD is still stored in NEF's cache, and the PFD can be directly acquired and forwarded.

Based on the embodiment described above, when the matching between APN information and APP ID in PFD acquisition request information and PFD management request information fails, it is indicated that the corresponding PFD is not present in NEF's cache. In such a case, PFD can be acquired by looking up the backup of UDR. For example, NEF can acquire the PFD corresponding to APN information and APP ID from NDR's backup according to the mapping relationship in UDR, and send the PFD to the SMF.

Figure 6:
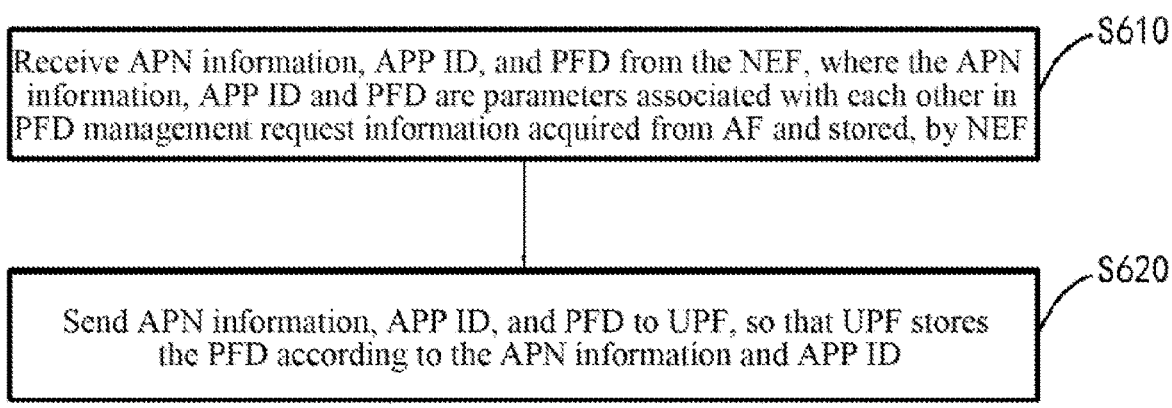
FIG. 6 depicts a flowchart showing a method for managing PFD applied to SMF according to another embodiment of the present disclosure.

Referring to FIG. 6, another embodiment of the present disclosure provides a method for PFD management, which is applied to SMF, the method includes but is not limited to S610 and step S620.

At S610, APN information, APP ID, and PFD is received from the NEF, where the APN information, APP ID and PFD are parameters associated with each other in the PFD management request information acquired from the AF and stored, by the NEF.

In an embodiment, the SMF can be operated in the PULL mode, to actively acquire the data from the NEF through the acquisition request. Alternatively, the SMF can be operated in the PUSH mode to receive the message with parameters from NEF. The mode in which the SMF operates can be selected according to actual requirements, and which is not limited in this embodiment. It can be appreciated that, in addition to APN information, APP ID, and PFD, other parameters can also be acquired from NEF, and specific parameters can be added according to actual demands, and which will not be further discussed here.

In an embodiment, APN information, APP ID, and PFD can be acquired in a manner as described in the embodiment shown in FIG. 1, and which will not be repeated here.

At S620, the APN information, APP ID, and PFD are sent to UPF, so that UPF can store the PFD according to the APN information and APP ID.

In an embodiment, the SMF, after receiving the APN information, APP ID and PFD, stores the above parameters locally in the form of a cache, and then sends the parameters in SMF to UPF under the data request from the UPF that establishes a connection with the SMF. Alternatively, the APN information, APP ID, and PFD can be directly forwarded to the determined UPF. For example, after receiving the APN information, APP ID, and PFD, the SMF sends a management request to the determined UPF, which includes the APN information, APP ID, and PFD. Upon receiving the management request, the UPF acquires the parameters contained in the management request and stores them locally for subsequent operation.

Figure 7:
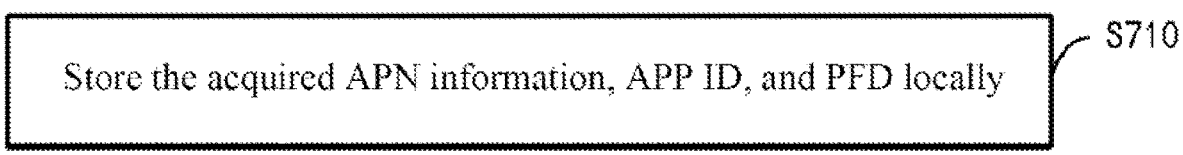
FIG. 7 depicts a flowchart showing the storage of parameters by the SMF in the method for managing PFD applied to the SMF according to another embodiment of the present disclosure.

Referring to FIG. 7, in an embodiment, S610 in the embodiment shown in conjunction with FIG. 6 further includes, but is not limited to, the following operations.

At S710, the acquired APN information, APP ID, and PFD are stored locally.

In an embodiment, SMF stores the APN information, APP ID, and PFD locally, and can quickly acquire the corresponding PFD when the Policy Control function (PCF) issues or activates the Policy and Charging Control (PCC) rules based on APP ID under an APN, so as to quicken the response.

In an embodiment, PFD can be stored locally in SMF in the form of grouping, for example, grouping according to the APN information and APP ID, and PFD can be identified according to the APN information. It can be understood that SMF can also maintain the cache duration of PFD packets stored locally, so as to control the effective duration of the PFD. For example, when the cache duration of PFD exceeds the effective duration, the PFD packets will be discarded to save SMF resources. The maintenance method of effective duration can be particularly selected according to actual requirements, and which is not limited in this embodiment.

Figure 8:
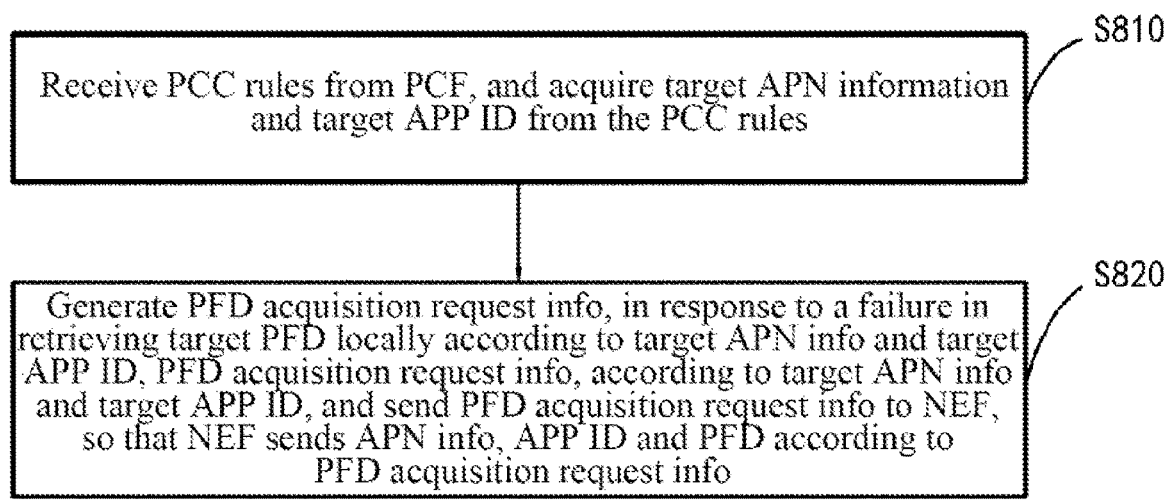
FIG. 8 depicts a flowchart showing the response to the PCC rules in the method for managing PFD applied to the SMF according to another embodiment of the present disclosure.

Referring to FIG. 8, in an embodiment, S610 in the embodiment shown in conjunction with FIG. 6 further includes, but is not limited to, the following operations.

At S810, PCC rules are received from PCF, and target APN information and target APP ID are acquired from the PCC rules.

At S820, in response to a failure in retrieving a target PFD locally according to the target APN information and the target APP ID, PFD acquisition request information is generated according to the target APN information and the target APP ID, and the PFD acquisition request information is sent to the NEF, so that the NEF sends APN information, APP ID and PFD according to the PFD acquisition request information.

Based on the above-described embodiment, after receiving the PCC rules, SMF can first perform matching with the target APN information and the target APP ID to avoid that the corresponding PFD is discarded by SMF due to the expiration of effective during, or the failure of acquiring related parameters by the SMF from the NEF. It can be understood that if the PFD can be retrieved locally from the SMF, it is only necessary to directly acquire the PFD for subsequent operation, and which will not be further discussed here.

In an embodiment, PCC rules can be initiated in any way. For example, an operator needs to charge an APP ID under a certain APN information, and issue or activate PCC rules including the APN information and the APP ID to SMF according to PCF, so that SMF can acquire the PFD in response to the PCC rules. The generation of the PCC rules is out of the discussion here.

Figure 9:
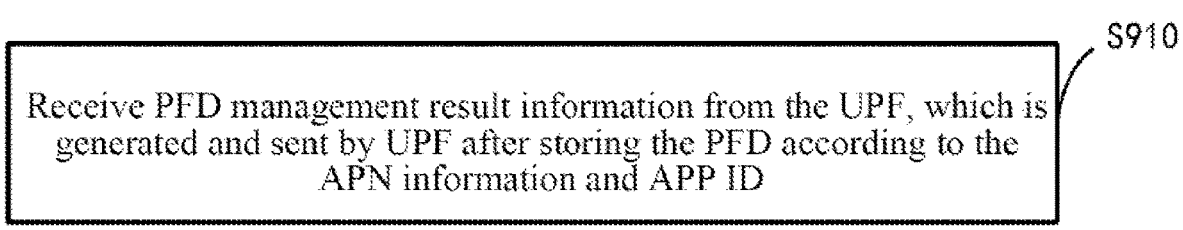
FIG. 9 depicts a flowchart showing the acquisition of the PFD management result information in the method for managing PFD applied to the SMF according to another embodiment of the present disclosure.

Referring to FIG. 9, in an embodiment, S620 in the embodiment shown in conjunction with FIG. 6 further includes, but is not limited to, the following operations.

At S910, PFD management result information is received from the UPF, which is generated and sent by UPF after storing the PFD according to the APN information and APP ID.

In an embodiment, the PFD management result information can be information indicating the operation result of UPF, such as the result information concerning a successful processing or the result information concerning a failed processing. And a response can be generated according to the actual operation result of UPF. The SMF can determine whether the UPF successfully obtains the PFD corresponding to APN information and APP ID according to the PFD management result information, so as to determine whether to close the current session or create a new session.

In order to better illustrate the technical scheme of the present disclosure, the method for PFD management is illustrated by way of the following two examples.

Figure 10:
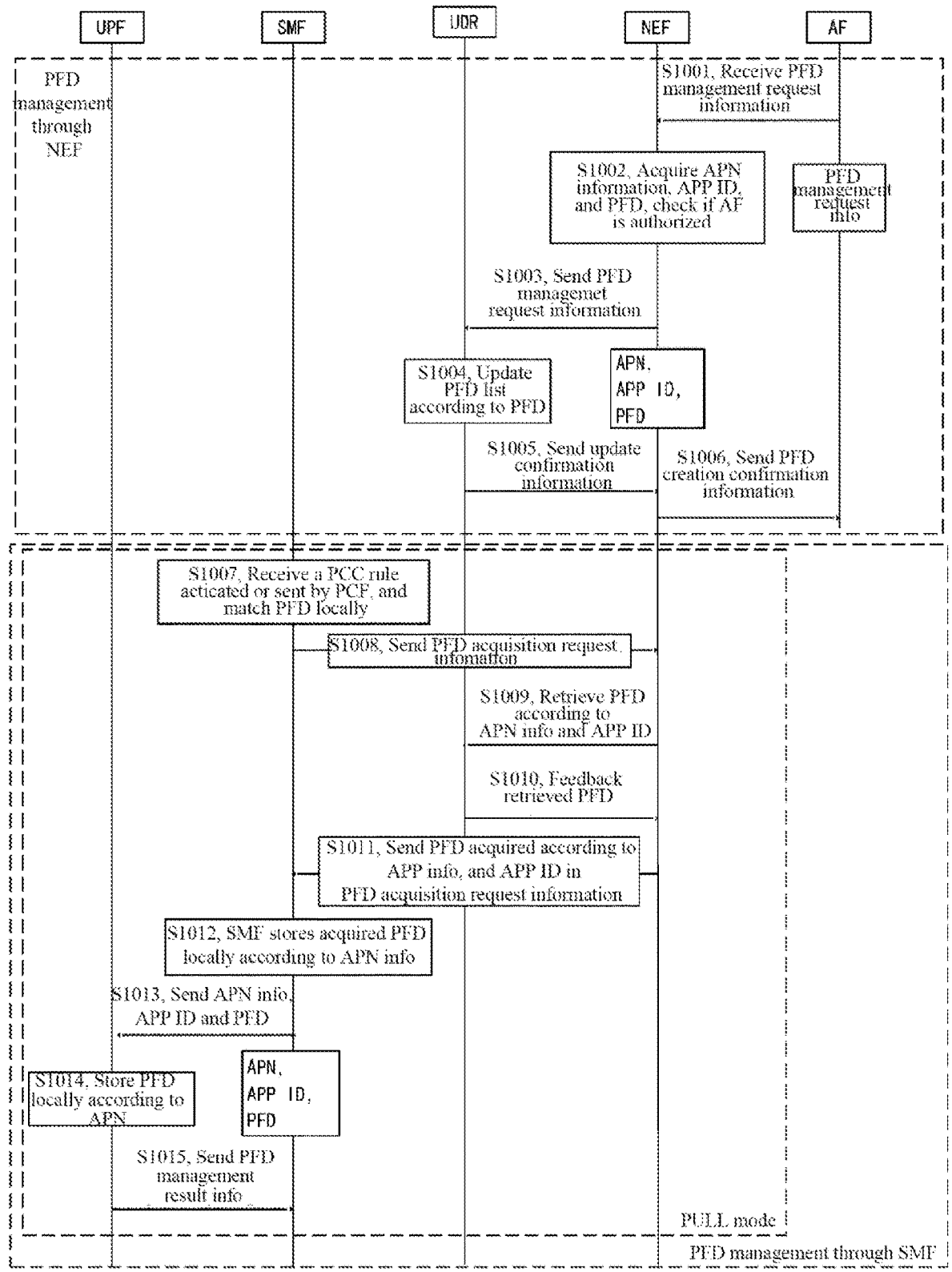
FIG. 10 depicts a schematic diagram showing an example of a method for managing PFD according to another embodiment of the present disclosure.

Example 1: Referring to FIG. 10, which depicts a schematic diagram showing the flow of interaction of SMF querying PFD from NEF in PULL mode, which includes the following operations.

At S1001, NEF receives PFD management request information from AF.

At S1002, NEF acquires APN information, APP ID, and PFD from the PFD management request information, and checks whether the AF is authorized according to the operator's policy.

At S1003, NEF sends APN information, APP ID, and PFD in the PFD management request information to UDR.

At S1004, UDR determines the corresponding PFD list according to the APN information and APP ID, and updates the PFD list according to the PFD.

At S1005, UDR sends update confirmation information to NEF.

At S1006, NEF sends PFD creation confirmation information to AF.

At S1007, SMF receives a PCC rule including APN information and APP ID activated or sent by PCF, and matches the PFD locally.

At S1008, When SMF fails to match PFD locally according to PCC rules, or the cache time of PFD corresponding to an APP ID in SMF is expired, SMF sends PFD acquisition request information to NEF, which includes APN information and APP ID.

At S1009, NEF retrieves PFD from UDR according to APN information and APP ID in PFD acquisition request information.

At S1010, UDR feeds back the retrieved PFD to NEF.

At S1011, NEF sends the PFD acquired according to APN information and APP ID in PFD acquisition request information to SMF.

At S1012, SMF stores the acquired PFD locally according to APN information, and maintains the cache duration of PFD to control the effective duration of the PFD.

At S1013, SMF sends APN information, APP ID, and PFD to UPF.

At S1014, UPF stores the PFD locally according to APN.

At S1015, UPF sends PFD management result information to SMF.

Figure 11:
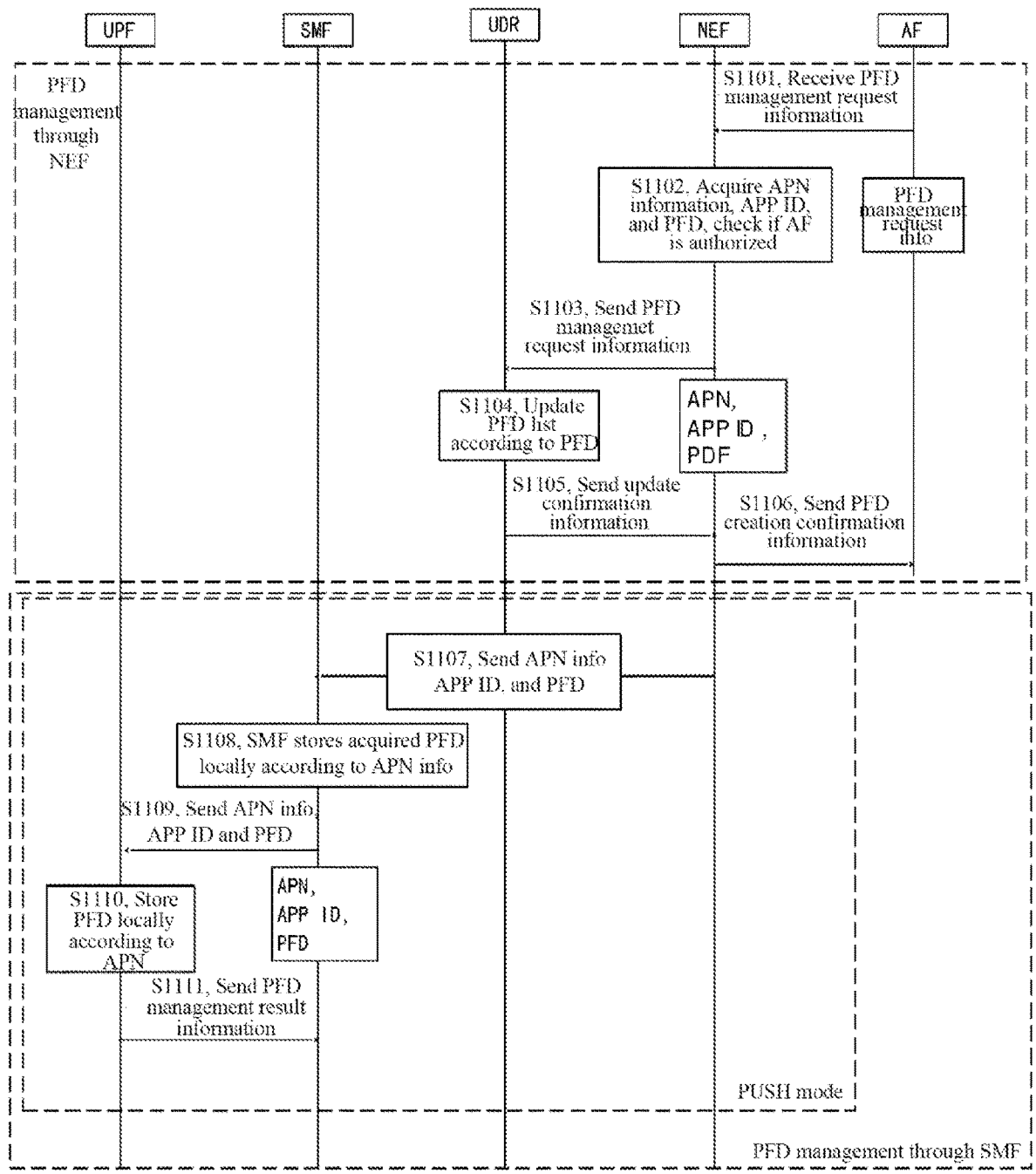
FIG. 11 depicts a schematic diagram showing an example of a method for managing PFD according to another embodiment of the present disclosure.

Example 2: Referring to FIG. 11, which depicts a schematic diagram showing the flow of interaction of SMF querying PFD from NEF in PUSH mode, which includes the following operations.

At S1101, NEF receives PFD management request information from AF.

At S1102, NEF acquires APN information, APP ID, and PFD from the PFD management request information, and checks whether the AF is authorized according to the operator's policy.

At S1103, NEF sends APN information, APP ID, and PFD of PFD management request information to UDR.

At S1104, UDR determines the corresponding PFD list according to APN information and APP ID, and updates the PFD list according to PFD.

At S1105, UDR sends update confirmation information to NEF.

At S1106, NEF sends PFD creation confirmation information to AF.

At S1107, NEF sends APN information, APP ID and PFD to SMF.

At S1108, SMF stores the acquired PFD locally according to APN information, and maintains the cache duration of PFD to control the effective duration of the PFD.

At S1109, SMF sends APN information, APP ID, and PFD to UPF.

AT S1110, UPF stores PFD locally according to APN.

At S1111, UPF sends PFD management result information to SMF.

Figure 12:
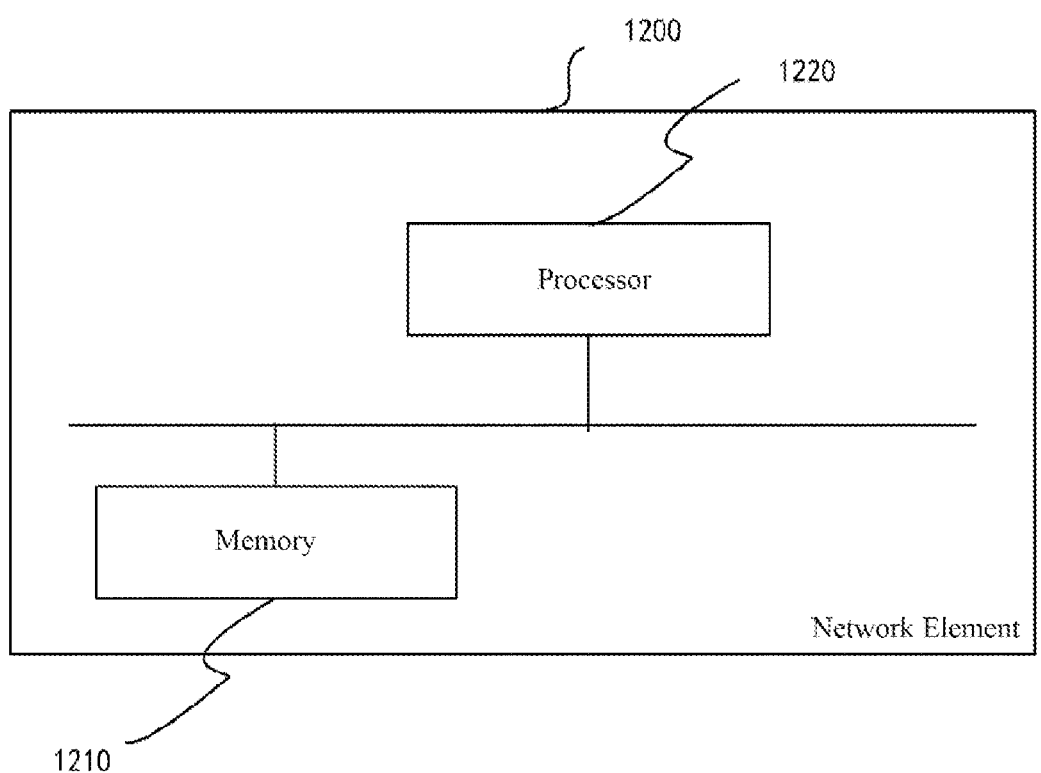
FIG. 12 depicts a schematic diagram showing a network element for executing a method for managing PFD according to another embodiment of the present disclosure.

Referring to FIG. 12, an embodiment of the present disclosure further provides a network element 1200, which includes a memory 1210, a processor 1220, and a computer program stored in the memory 1210 and executable by the processor 1220.

The processor 1220 and the memory 1210 may be connected by a bus or other means.

Non-transitory software programs and instructions of the method described in the above embodiments are stored in a memory which, when executed by a processor, causes the processor to carry out operations of the method described above, for example, the above-described operations S110 to S120 described in conjunction with FIGS. 1, S310 to S320 described in conjunction with FIG. 3, S410 described in conjunction with FIG. 4, S510 to S520 described in conjunction with FIG. 5, S610-S620 described in conjunction with FIG. 6, S710 described in conjunction with FIG. 7, S810-S820 described in conjunction with FIG. 8, or S910 described in conjunction with FIG. 9.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

In addition, an embodiment of the present disclosure further provides a computer-readable storage medium, which stores computer-executable instructions which, when executed by a processor or controller, for example, by a processor in the embodiment of the electronic device, causes the processor to carry out the operations of the method described above, for example, the above-described operations S110 to S120 described in conjunction with FIGS. 1, S310 to S320 described in conjunction with FIG. 3, S410 described in conjunction with FIG. 4, S510 to S520 described in conjunction with FIG. 5, S610-S620 described in conjunction with FIG. 6, S710 described in conjunction with FIG. 7, S810-S820 described in conjunction with FIG. 8, or S910 described in conjunction with FIG. 9.

An embodiment of the present disclosure includes, acquiring and storing PFD management request information sent by an AF, where the PFD management request information includes APN information, APP ID, and a PFD, and the APN information and APP ID are associated with the PFD; and forwarding the APN information, the APP ID and the PFD in the PFD management request information to a UPF through an SMF, to cause the UPF to store the PFD according to the APN information and the APP ID. According to the technical scheme provide in various embodiments of the present disclosure, APN information can be appended on the basis of PFD and APP ID, so that UPF can identify PFD according to APN, thus avoiding overlapping between the service data streams, application probes or charging control information, and improving charging accuracy.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer readable instructions, data structures, program modules or other data. Computer storage medium include, but are not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description for some embodiments of the present disclosure, but the present disclosure is not limited to the above embodiments. Those having ordinary skills in the art can various equivalent modifications or substitutions without departing the scope of the present disclosure, and these equivalent modifications or substitutions are within the scope defined by the claims of the present disclosure.

What is claimed is:

1. A method for managing Packet Flow Description (PFD), which is applied to a Network Exposure Element (NEF), the method comprising:
    acquiring and storing PFD management request information sent by an Application Function (AF), wherein the PFD management request information comprises access point name (APN) information, an application identifier (APP ID), and a PFD, and the APN information and APP ID are associated with the PFD, such that a User Plane Function (UPF) is allowed to identify the PFD according to the APN information; and
    forwarding the APN information, the APP ID, and the PFD in the PFD management request information to the UPE through a Session Management Function (SMF), to cause the UPF to store the PFD according to the APN information and the APP ID.

2. The method of claim 1, wherein acquiring and storing the PFD management request information sent by an AF further comprises, sending the APN information, the APP ID, and the PFD of the PFD management request information to a Unified Data Repository (UDR), so that the UDR determines a mapping relationship corresponding to the APN information, and updates the mapping relationship according to the APP ID and the PFD, wherein the mapping relationship is the mapping relationship between the APP ID and the PFD; and
    storing the PFD management request information in response to a reception of update confirmation information sent by the UDR.

3. The method of claim 2, wherein after storing the PFD management request information, the method further comprises, sending PFD creation confirmation information to the AF, to cause the AF to confirm that a response to the sent PFD management request information is completed.

4. The method of claim 1, wherein forwarding the APN information, the APP ID, and the PFD in the PFD management request information to a UPF through an SMF comprises, receiving PFD acquisition request information sent by the SMF; and
    forwarding the APN information, the APP ID, and the PFD in the PFD management request information to the UPF through the SMF, in response to the APN information in the PFD acquisition request information matching with the APN information in the PFD management request information, and the APP ID in the PFD acquisition request information matching with the APP ID in the PFD management request information.

5. A method for managing Packet Flow Description (PFD), which is applied to a Session Management Function (SMF), the method comprising:
    acquiring access point name (APN) information, an Application Identifier (APP ID), and a PFD sent by a Network Exposure Function (NEF), wherein the APN information, APP ID, and the PFD are parameters associated with each other in PFD management request information, such that a User Plane Function (UPF) is allowed to identify the PFD according to the APN information, and the PFD management request information is acquired from an Application Function (AF) and stored by the NEF), and maintaining a cache duration of the PFD; and
    sending the APN information, the APP ID, and the PFD to the UPF, to cause the UPF to store the PFD according to the APN information and the APP ID.

6. The method of claim 5, wherein after acquiring the APN information, APP ID, and PFD sent by a NEF, the method further comprises, storing the acquired APN information, APP ID, and PFD locally.

7. The method of claim 6, wherein acquiring the APN information, APP ID, and PFD sent by a NEF comprises, receiving a Policy and Charging Control (PCC) rule sent by a Policy Control Function (PCF), and acquiring target APN information and target APP ID from the PCC rule; and
    in response to a failure in retrieving a target PFD locally according to the target APN information and the target APP ID, generating PFD acquisition request information according to the target APN information and the target APP ID, and sending the PFD acquisition request information to the NEF, to cause the NEF to send the APN information, the APP ID and the PFD according to the PFD acquisition request information.

8. The PFD management method of claim 7, wherein after sending the APN information, the APP ID, and the PFD to a UPF, the method further comprises, acquiring PFD management result information sent by the UPF, wherein the PFD management result information is generated and sent by the UPF after storing the PFD according to the APN information and APP ID.

9. A non-transitory computer-readable storage medium storing a computer-executable instruction which, when executed by a processor causes the processor to carry out a method for managing Packet Flow Description (PFD), which is applied to a Network Exposure Element (NEF), the method comprising:
    acquiring and storing PFD management request information sent by an Application Function (AF), wherein the PFD management request information comprises access point name (APN) information, application identifiers (APP ID), and a PFD, and the APN information and APP ID are associated with the PFD, such that the UPF is allowed to identify the PFD according to the APN information; and
    forwarding the APN information, the APP ID, and the PFD in the PFD management request information to a (user plane function) UPF through a Session Management Function (SMF), to cause the UPF to store the PFD according to the APN information and the APP ID;
    or, the computer program which, when executed by the processor causes the processor to carry out a method for managing Packet Flow Description (PFD), which is applied to a Session Management Function (SMF), the method comprising,
    acquiring access point name (APN) information, an Application Identifier (APP ID), and a PFD sent by a Network Exposure Function (NEF), wherein the APN information, APP ID, and the PFD are parameters associated with each other in PFD management request information, such that the UPF is allowed to identify the PFD according to the APN information, and the PFD management request information is acquired from an Application Function (AF) and stored by the NEF), and maintaining a cache duration of the PFD; and sending the APN information, the APP ID, and the PFD to a User Plane Function (UPF), to cause the UPF to store the PFD according to the APN information and the APP ID.

10. The non-transitory computer-readable storage medium of claim 9, wherein acquiring and storing the PFD management request information sent by an AF further comprises, sending the APN information, the APP ID, and the PFD of the PFD management request information to a Unified Data Repository (UDR), so that the UDR determines a mapping relationship corresponding to the APN information, and updates the mapping relationship according to the APP ID and the PFD, wherein the mapping relationship is the mapping relationship between the APP ID and the PFD; and storing the PFD management request information in response to a reception of update confirmation information sent by the UDR.

11. The non-transitory computer-readable storage medium of claim 10, wherein after storing the PFD management request information, the method further comprises, sending PFD creation confirmation information to the AF, to cause the AF to confirm that a response to the sent PFD management request information is completed.

12. The non-transitory computer-readable storage medium of claim 9, wherein forwarding the APN information, the APP ID, and the PFD in the PFD management request information to a UPF through an SMF comprises, receiving PFD acquisition request information sent by the SMF; and forwarding the APN information, the APP ID, and the PFD in the PFD management request information to the UPF through the SMF, in response to the APN information in the PFD acquisition request information matching with the APN information in the PFD management request information, and the APP ID in the PFD acquisition request information matching with the APP ID in the PFD management request information.

13. The non-transitory computer-readable storage medium of claim 9, wherein after acquiring the APN information, APP ID, and PFD sent by a NEF, the method further comprises, storing the acquired APN information, APP ID, and PFD locally.

14. The non-transitory computer-readable storage medium of claim 13, wherein acquiring the APN information, APP ID, and PFD sent by a NEF comprises, receiving a Policy and Charging Control (PCC) rule sent by a Policy Control Function (PCF), and acquiring target APN information and target APP ID from the PCC rule; and in response to a failure in retrieving a target PFD locally according to the target APN information and the target APP ID, generating PFD acquisition request information according to the target APN information and the target APP ID, and sending the PFD acquisition request information to the NEF, to cause the NEF to send the APN information, the APP ID and the PFD according to the PFD acquisition request information.

15. The non-transitory computer-readable storage medium of claim 14, wherein after sending the APN information, the APP ID, and the PFD to a UPF, the method further comprises, acquiring PFD management result information sent by the UPF, wherein the PFD management result information is generated and sent by the UPF after storing the PFD according to the APN information and APP ID.

* * * * *